(12) United States Patent
Visser et al.

(10) Patent No.: US 11,848,896 B2
(45) Date of Patent: Dec. 19, 2023

(54) TDD SLOT FORMAT SELECTION SERVICE

(71) Applicant: Verizon Patent and Licensing Inc., Basking Ridge, NJ (US)

(72) Inventors: Matthijs Andries Visser, Randolph, NJ (US); Sachin Vargantwar, Cumming, GA (US); Mark Ernest Newbury, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 229 days.

(21) Appl. No.: 17/139,248

(22) Filed: Dec. 31, 2020

(65) Prior Publication Data

US 2022/0209929 A1 Jun. 30, 2022

(51) Int. Cl.
| | |
|---|---|
| *H04L 43/16* | (2022.01) |
| *H04W 72/12* | (2023.01) |
| *H04L 5/14* | (2006.01) |
| *H04L 41/0803* | (2022.01) |
| *H04W 24/08* | (2009.01) |
| *H04W 72/02* | (2009.01) |

(52) U.S. Cl.
CPC ............ *H04L 5/14* (2013.01); *H04L 41/0803* (2013.01); *H04L 43/16* (2013.01); *H04W 24/08* (2013.01); *H04W 72/02* (2013.01)

(58) Field of Classification Search
CPC .................................. H04L 5/14; H04W 72/08
USPC .......................................................... 370/252
See application file for complete search history.

(56) References Cited

U.S. PATENT DOCUMENTS

| | | | | |
|---|---|---|---|---|
| 2015/0358895 A1* | 12/2015 | Cho | ........................ | H04W 24/02 370/329 |
| 2015/0359019 A1* | 12/2015 | Chen | ........................ | H04W 76/12 370/329 |
| 2016/0344532 A1* | 11/2016 | Bhat | ..................... | H04W 64/003 |

* cited by examiner

*Primary Examiner* — Angel T Brockman

(57) ABSTRACT

A method, a device, and a non-transitory storage medium are described in which a TDD slot format selection service is provided. The service may calculate a distance between a radio access network device and an end device and use the distance to select a TDD configuration for the end device. The service may use other criteria to select the TDD configuration such as downlink or uplink ratios and/or interference value pertaining to a neighboring radio access network device. The service may also include scheduling of traffic adjustments based on a determined traffic bias associated with the end device and slot format symbols.

20 Claims, 15 Drawing Sheets

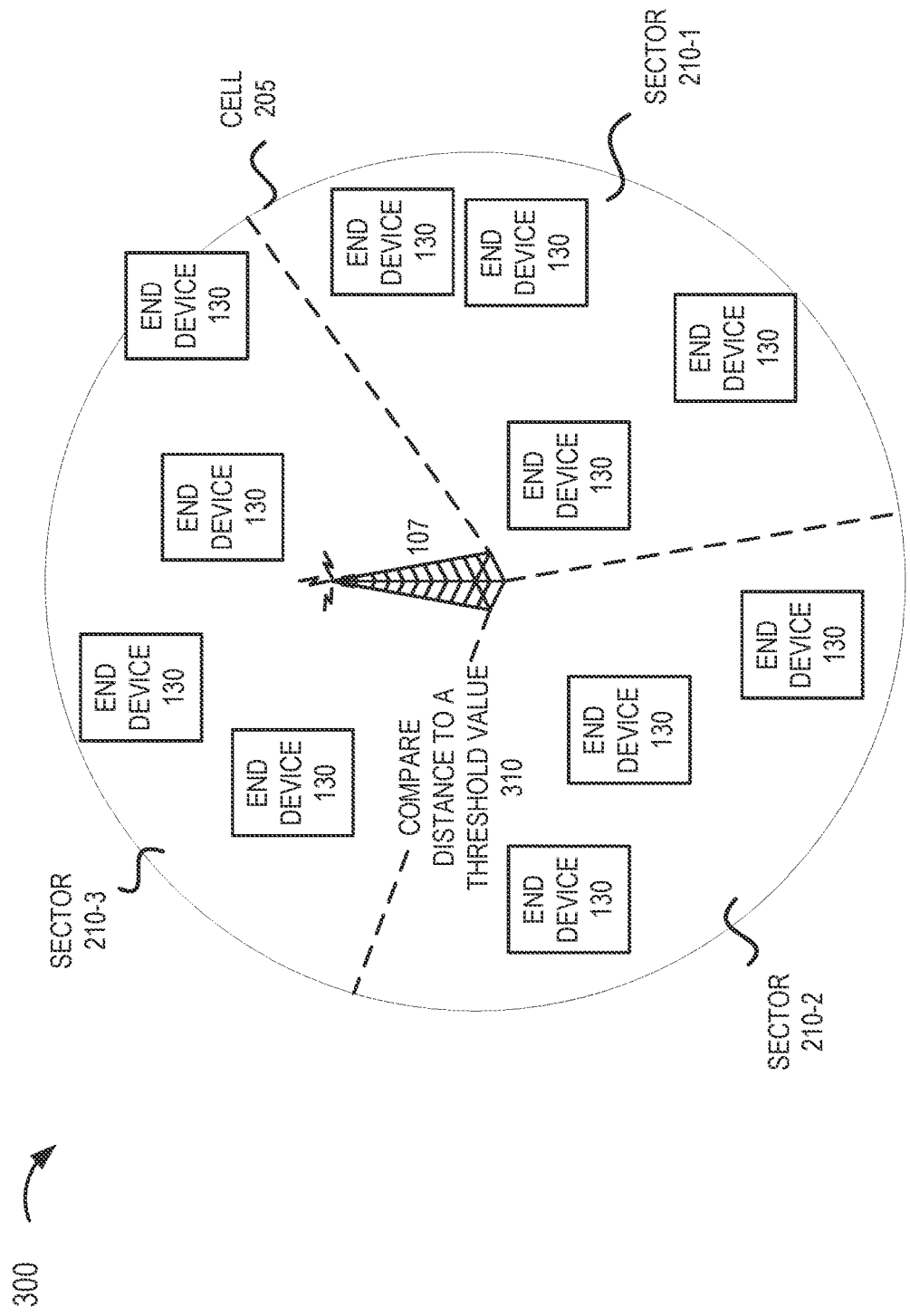

| FORMAT | 0 | 1 | 2 | 3 | 4 | 5 | 6 | 7 | 8 | 9 | 10 | 11 | 12 | 13 | ... | 29 | 30 | 31 |
|---|---|---|---|---|---|---|---|---|---|---|---|---|---|---|---|---|---|---|
| 0 | D | D | D | D | D | D | D | D | D | D | D | D | D | D | ... | D | D | U |
| 1 | U | U | U | U | U | U | U | U | U | U | U | U | U | U | ... | D | F | F |
| 2 | F | F | F | F | F | F | F | F | F | F | F | F | F | F | ... | D | F | U |

Fig. 4B

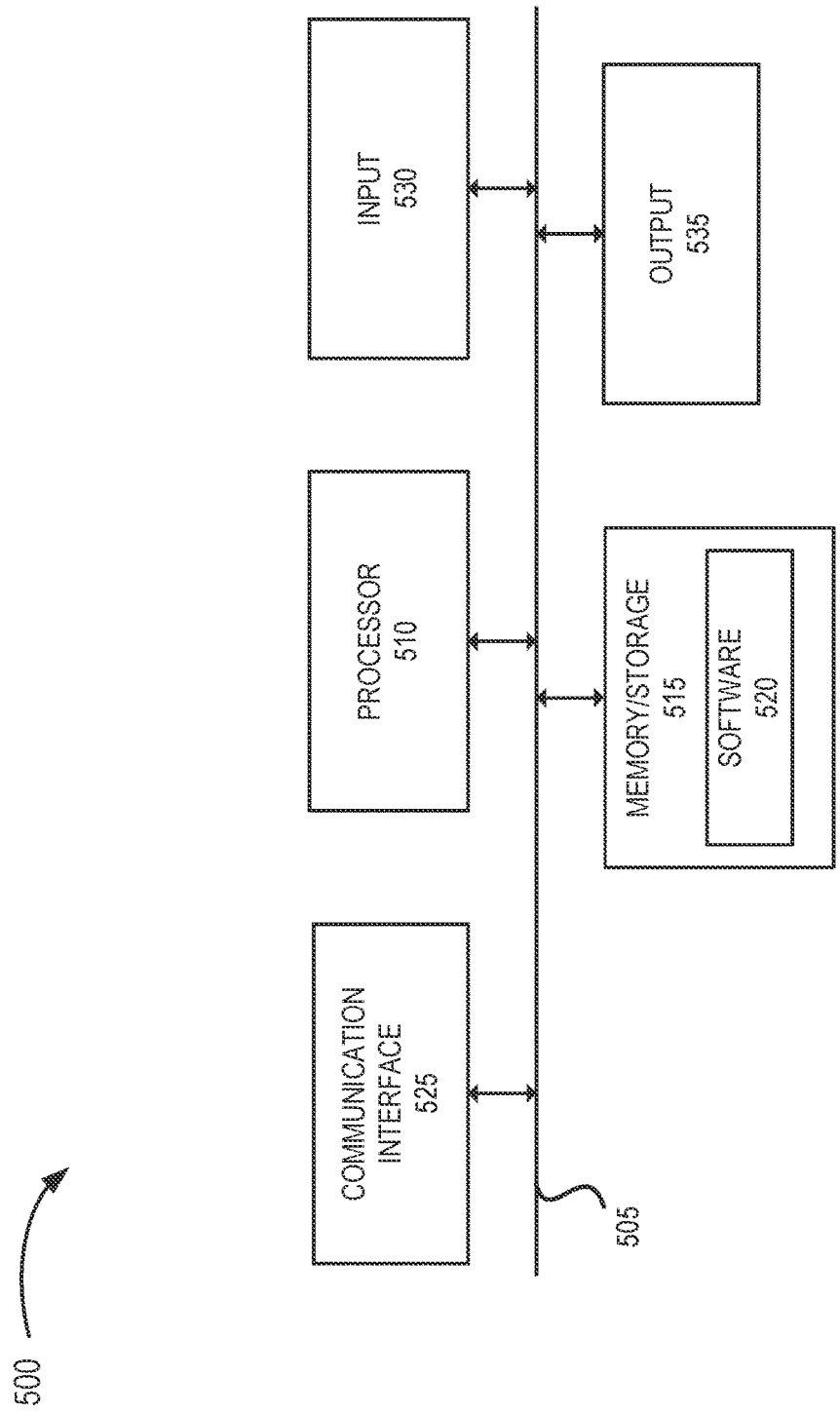

TDD SLOT FORMAT SELECTION SERVICE

BACKGROUND

Development and design of networks present certain challenges from a network-side perspective and an end device perspective. Typical wireless communication systems may use multiple-access technologies, such as code division multiple access (CDMA), time division multiple access (TDMA), frequency division multiple access (FDMA), and variants thereof, which may support communication with multiple users by sharing available network resources.

BRIEF DESCRIPTION OF THE DRAWINGS

FIGS. 3A-3G are diagrams illustrating an exemplary process of an exemplary embodiment of the TDD slot format selection service;

FIG. 4B is a diagram illustrating exemplary slot format information;

FIG. 5 is a diagram illustrating exemplary components of a device that may correspond to one or more of the devices illustrated and described herein;

DETAILED DESCRIPTION

Figure 1:
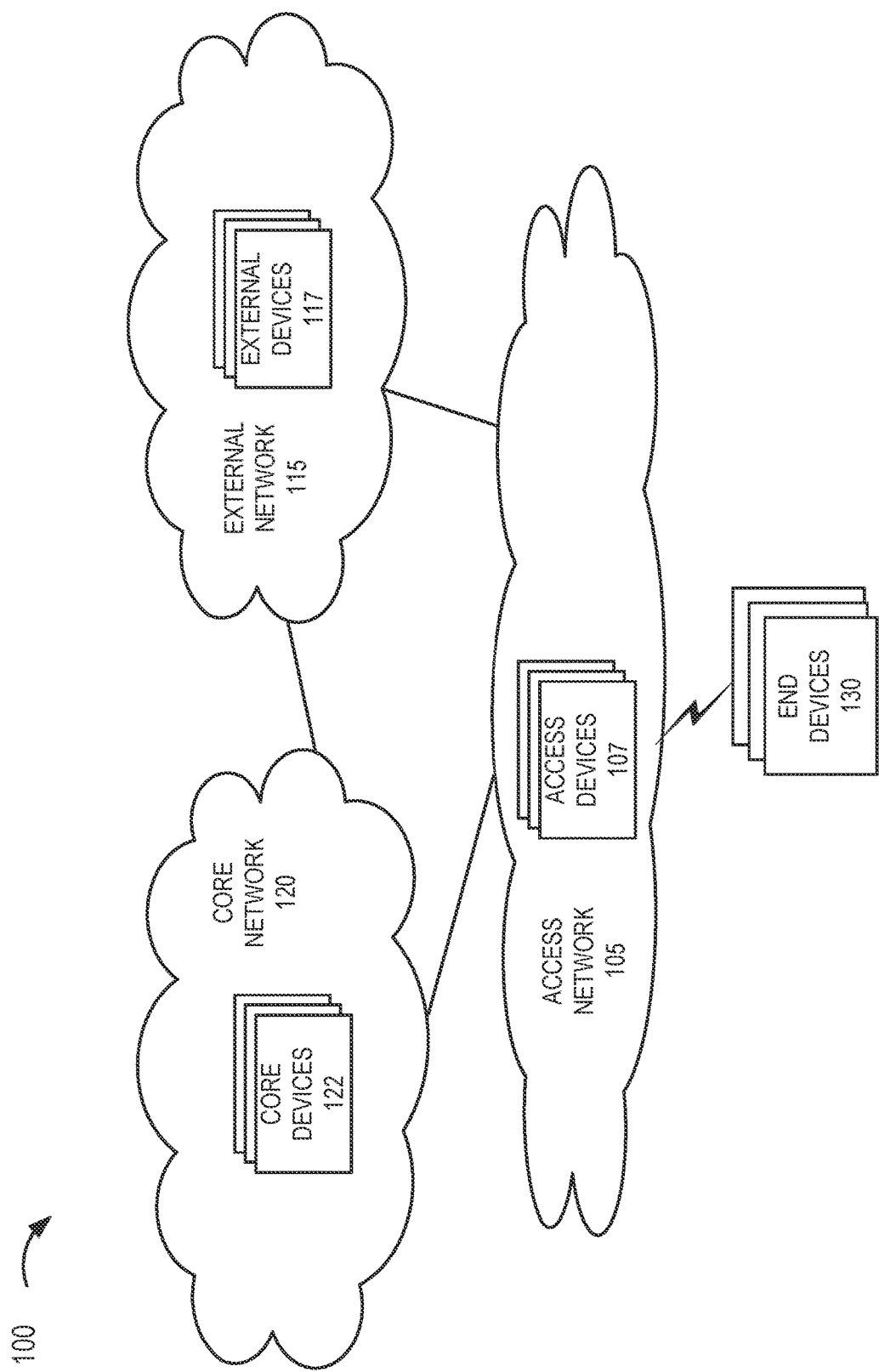
FIG. 1 is a diagram illustrating an exemplary environment in which an exemplary embodiment of a time-division duplexing (TDD) slot format selection service may be implemented.

The following detailed description refers to the accompanying drawings. The same reference numbers in different drawings may identify the same or similar elements. Also, the following detailed description does not limit the invention.

Time-division duplexing (TDD) supports duplex communication in which uplink and downlink transmissions may occur during different time slots (e.g., uplink slot and downlink slot) via a shared frequency band or channel. TDD may also provide a switching slot (also known as a guard period or a guard time) that is a time gap between the uplink and the downlink. In some cases, the guard period may provide time for a device to switch between transmitting data and receiving data. In a radio access network (RAN), for example, a particular guard period may be set, while the distance between user equipment (UE) and a wireless station (e.g., evolved Node B (eNB), next generation Node B (gNB), or another type of radio access network (RAN) device) may change over time and undermine the effectiveness of the selected guard period.

The configuration of TDD may be specified by a slot format. For example, the slot format may specify a certain configuration for downlink symbols, uplink symbols, and flexible symbols. Slot formats may differ based on the number and order of downlink, uplink, and flexible symbols, for example. A slot format with more flexible symbols may support a larger cell radius compared to another slot format with fewer flexible symbols. However, this may result in a decrease in spectral efficiency.

Currently, there are different slot formats being proposed. Additionally, there are different implementations of TDD, such as dynamic TDD, static TDD, and semi-static TDD, for example. However, the selection and use of a slot format to enable devices to optimally communicate can be complex due to a potentially ever-changing context during communication. Additionally, the configuration of the switching symbols of the slot format that provides an optimal switching time for a device based on ever-changing context factors can be problematic.

According to exemplary embodiments, a TDD slot format selection service is provided. According to an exemplary embodiment, the TDD slot format selection service may select and assign a TDD slot format based on a distance between devices. For example, an end device closer to a wireless station may be assigned a slot format having fewer switching symbols relative to another end device that may be farther away from the wireless station. According to an exemplary embodiment, the TDD slot format selection service may include one or multiple threshold values that relate to distance between devices. According to an exemplary embodiment, the TDD slot format selection service may select a slot format that correlates to a threshold value that is satisfied, as described herein.

According to an exemplary embodiment, the TDD slot format selection service may select a slot format based on the traffic behavior associated with an application. For example, an application that is biased towards downlink traffic, the TDD slot format selection service may not schedule any uplink traffic for an end device in one or multiple uplink symbols that may be present after a flexible symbol. According to another example, an application that is biased towards uplink traffic, the TDD slot format selection service may not schedule any downlink traffic for an end device in one or multiple downlink symbols that may be present before a flexible symbol.

According to an exemplary embodiment, the TDD slot format selection service may use a data traffic profile associated with an application and/or an end device to calculate a TDD ratio of downlink-to-uplink slots or uplink-to-downlink slots. For example, the TDD slot format selection service may calculate a ratio between uplink and downlink data volume and select a slot format based on the calculated ratio. The TDD slot format selection service may also consider an interference value associated with a neighboring wireless station.

In view of the foregoing, the TDD slot format selection service may improve spectral efficiency of communication between devices based on the selection and use of an optimal slot format. Additionally, the TDD slot format selection service may select a TDD slot format that provides optimal symbol configurations that support uplink and downlink transmissions and switching time for a given context. The TDD slot format selection service may select and configure a TDD slot format based on various factors, such as distance between devices, a traffic profile, interference associated with neighboring devices, traffic scheduling, and other mechanisms as described herein.

FIG. 1 is a diagram illustrating an exemplary environment 100 in which an exemplary embodiment of the TDD slot format selection service may be implemented. As illustrated, environment 100 includes access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or other type of network that may support a wireless service and/or an application service, as described herein.

The number, the type, and the arrangement of network devices, and the number of end devices 130 are exemplary. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication.

Access network 105 may include one or multiple networks of one or multiple types and technologies. For example, access network 105 may be implemented to include a 5G-access network (5G-AN) or a 5G-RAN and/or a future generation RAN (e.g., a 6G RAN or subsequent generation RAN). Access network 105 may include a legacy RAN (e.g., a Third Generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120. According to an exemplary embodiment, access network 105 may include the TDD slot format selection service, as described herein.

Access network 105 may include different and multiple functional splitting, such as options 1, 2, 3, 4, 5, 6, 7, or 8 that relate to combinations of access network 105 and core network 120 including an Evolved Packet Core (EPC) network and/or a NG core (NGC) network, or the splitting of the various layers (e.g., physical layer, Media Access Control (MAC) layer, RLC layer, and PDCP layer, etc.), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., non-standalone (NSA) NR, standalone (SA) New Radio (NR), etc.).

According to some exemplary embodiments, access network 105 may be implemented to include various architectures of wireless service, such as, for example, macrocell, microcell, femtocell, picocell, metrocell, new radio (NR) cell, Long Term Evolution (LTE) cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a next generation Node B (gNB), an evolved Long Term Evolution (eLTE) evolved Node B (eNB), an eNB, a radio network controller (RNC), a remote radio head (RRH), a baseband unit (BBU), a radio unit (RU), a centralized unit (CU), a CU control plane (CU CP), a CU user plane (CU UP), a distributed unit (DU), a small cell node (e.g., a picocell device, a femtocell device, a microcell device, a home eNB, etc.), open network devices (e.g., O-RAN Centralized Unit (O-CU), O-RAN Distributed Unit (O-DU), O-RAN next generation Node B (O-gNB), O-RAN evolved Node B (O-eNB)), 5G ultra-wide band (UWB) nodes, a future generation wireless access device (e.g., a 6G wireless station, a seventh generation (7G) wireless station, etc.), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple RATs (e.g., 4G and 5G functionality, 5G and 5.5G functionality, 5G and 6G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device.

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), 2D beamforming, antenna spacing, tilt (relative to the ground), radiation pattern, directivity, elevation, planar arrays, and so forth.

External network 115 may include one or multiple networks of one or multiple types and technologies. For example, external network 115 may be implemented to include a service or an application-layer network, a cloud network, a private network, a public network, a multi-access edge computing (MEC) network (also known as a mobile-edge computing (MEC) network), a fog network, the Internet, a service provider network, the World Wide Web (WWW), an Internet Protocol Multimedia Subsystem (IMS) network, a Rich Communication Service (RCS) network, software defined network (SDN), a virtual network, a packet-switched network, a data center, or other type of network that may provide access to and may host an end device application, service, or asset (also referred to as an "application service").

Depending on the implementation, external network 115 may include various network devices such as external devices 117. For example, external devices 117 may include servers (e.g., web, application, cloud, etc.), mass storage devices, data center devices, network function virtualization (NFV) devices, containers, virtual machines, SDN devices, cloud computing devices, platforms, and other types of network devices, platforms, and/or architectures pertaining to various network-related functions (e.g., security, management, charging, billing, authentication, authorization, policy enforcement, development, etc.).

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services.

Core network 120 may include one or multiple networks of one or multiple network types and technologies. Core network 120 may include a complementary network of access network 105. For example, core network 120 may be implemented to include a next generation core (NGC) network, an Evolved Packet Core (EPC) of an LTE network, an LTE-Advanced (LTE-A) network, and/or an LTE-A Pro network, a future generation core network (e.g., a 6G or beyond core network, etc.), and/or another type of core network.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), an NSSF, a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.).

End devices 130 include a device that may have computational and/or communication capabilities (e.g., wireless, wired, optical, etc.). End device 130 may be implemented as a mobile device, a portable device, a stationary device (e.g., a non-mobile device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, end device 130 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of end device 130 may vary among end devices 130.

Figure 2:
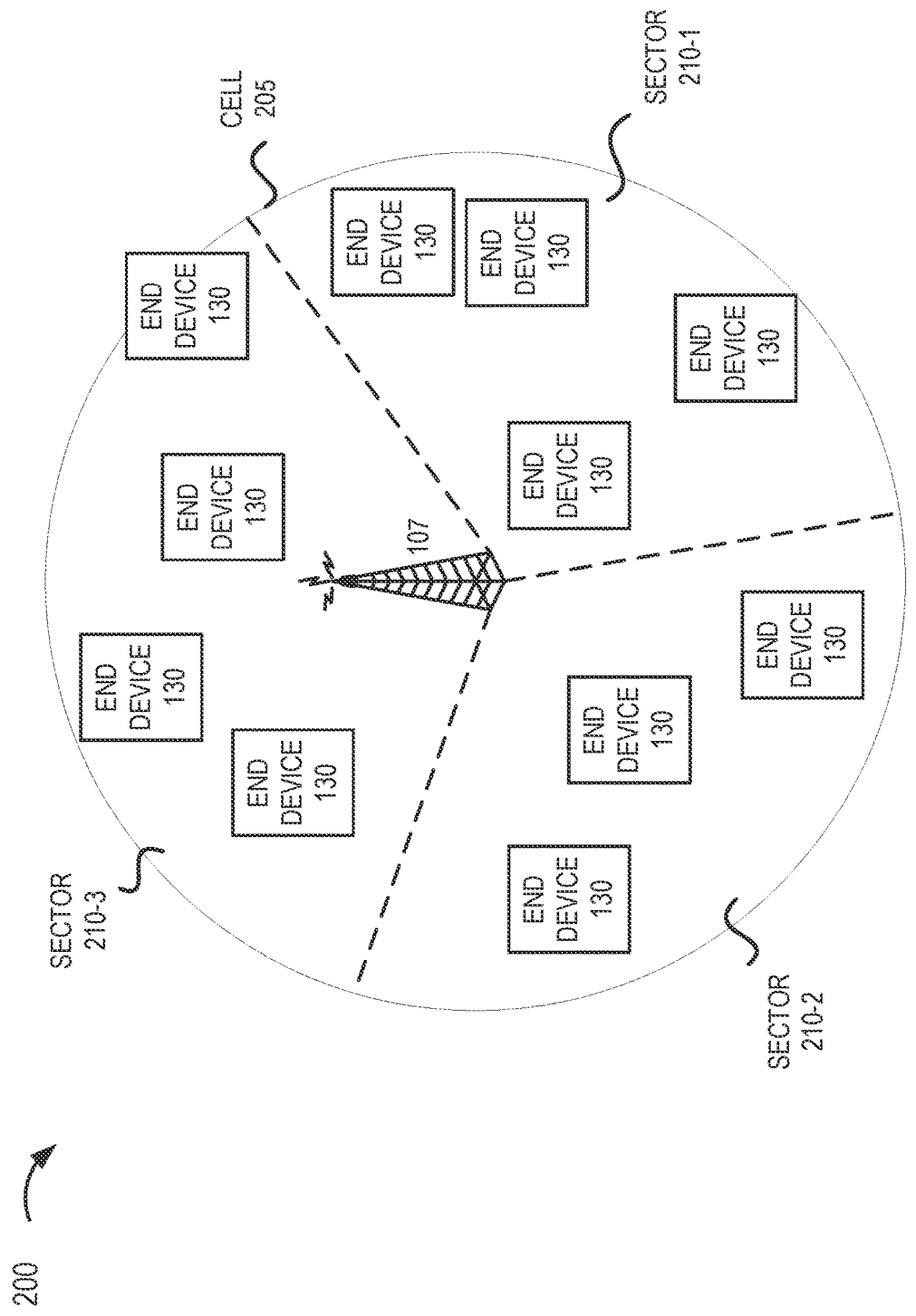
FIG. 2 is a diagram illustrating another exemplary environment in which an exemplary embodiment of the TDD slot format selection service may be implemented.

FIG. 2 is a diagram illustrating another exemplary environment 200 in which an exemplary embodiment of the TDD slot format selection service may be implemented. As illustrated, access device 107 may provide wireless service to a cell 205. Cell 205 may be considered a carrier or a combination of a carrier and a wireless service area. According to some exemplary implementations, cell 205 may include multiple sectors 201 (e.g., sectors 201-1 through 201-3 and also referred to individually or generally as sector 201). Although not illustrated, access device 107 may further include sub-sectors associated with an antenna (e.g., an antenna array, sub-array, single antenna, etc.) and beamforming techniques. The configuration of the wireless service area (e.g., shape, division, etc.) depicted is exemplary.

According to various exemplary embodiments, the TDD slot format selection service may be implemented by access device 107 at a cell level, a sector level, and/or a sub-sector level. Additionally, or alternatively, the TDD slot format selection service may be implemented by access device 107 at a group level (e.g., multiple end devices 130) and/or at an individual level (e.g., a single end device 130) in which a cell, a sector, and/or sub-sector may or may not be of relevance. For example, a group of end devices 130 may be distributed among multiple sectors (e.g., inter-sector level) or multiple sub-sectors (e.g., inter-sub-sector level). As further illustrated, environment 200 includes end devices 130.

FIGS. 3A-3G are diagrams illustrating exemplary processes 300 of the TDD slot format selection service. According to an exemplary scenario, assume access device 107 is a gNB. According to other exemplary scenarios, access device 107 may be another type of access device 107, as described herein.

Figure 3A:
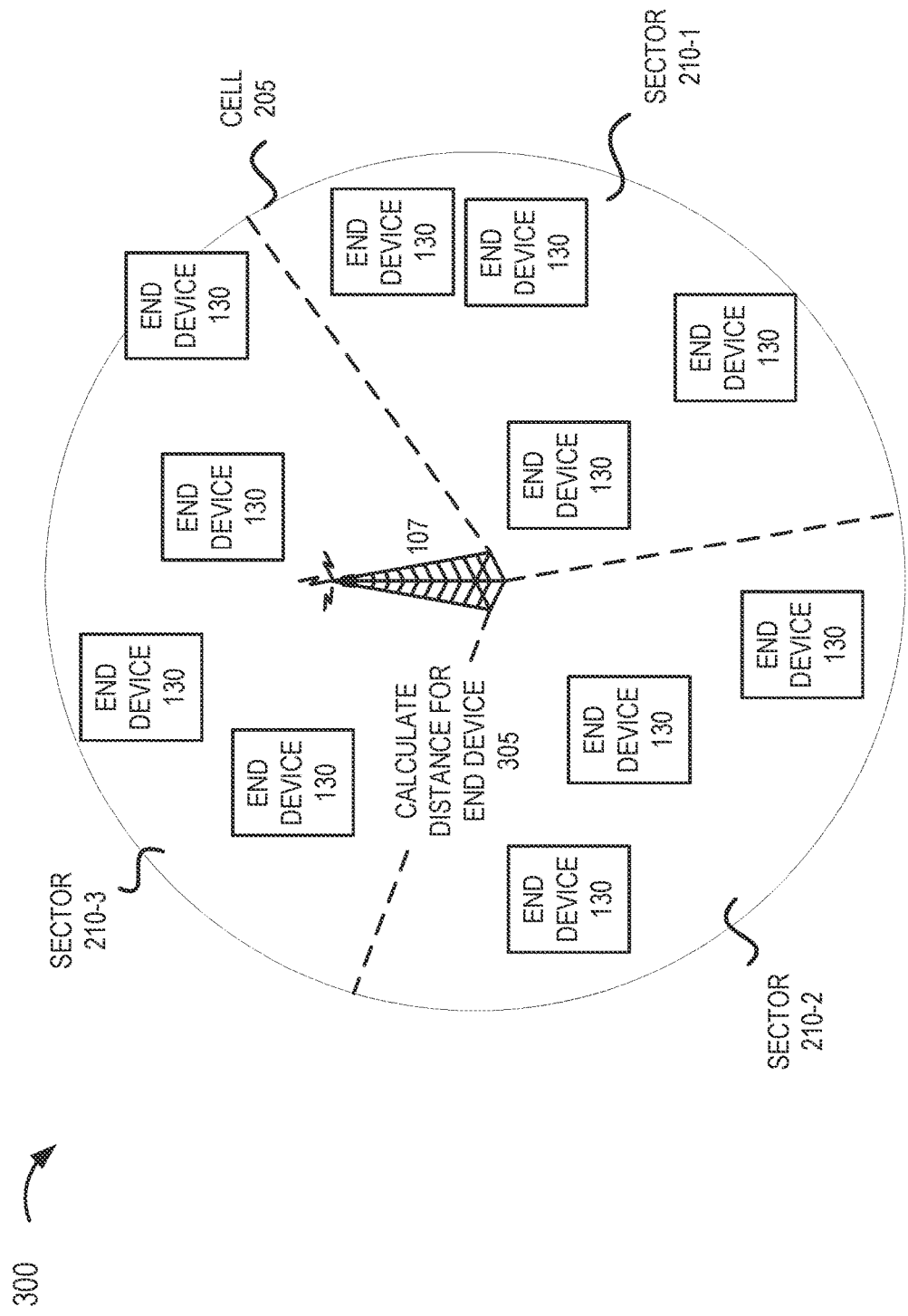

Referring to FIG. 3A, access device 107 may calculate a distance 305 between access device 107 and one or more end devices 130. For example, access device 107 may use various known techniques, such as signal arrival time (e.g., Observed Time Difference of Arrival (OTDOA), Uplink-Time Difference of Arrival (U-TDOA), etc.), Global Positioning System (GPS) coordinates, timing advance calculation, or other suitable mechanisms, for calculating the distance. Referring to FIG. 3B, based on the distance, access device 107 may compare the distance to a threshold value 310. Access device 107 may be configured with threshold values that relate to distances. For example, access device 107 may store information that correlates the threshold values with slot formats and/or slot-related information, as described herein.

Figure 4A:
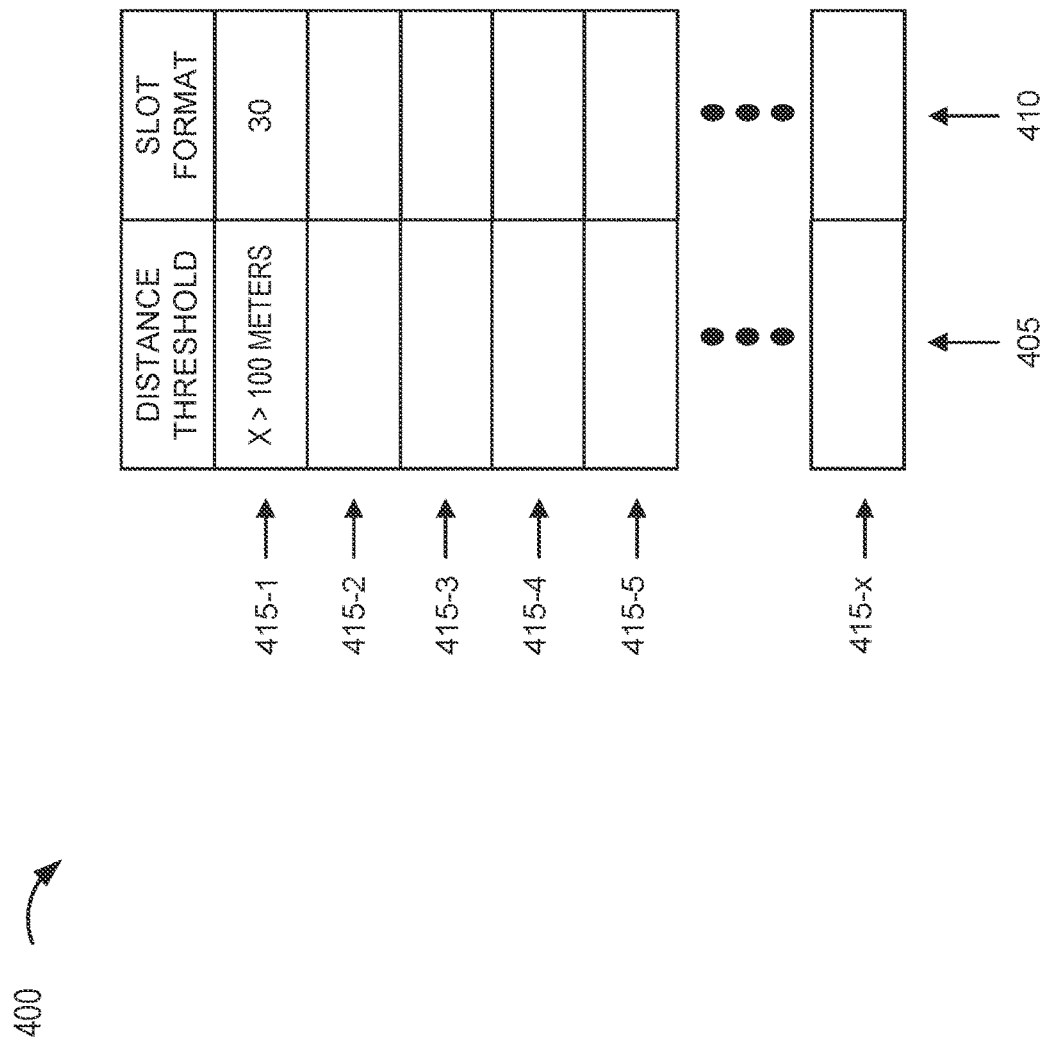
FIG. 4A is a diagram illustrating exemplary distance-to-slot format information.

FIG. 4A is a diagram illustrating exemplary distance-to-slot format information. As illustrated, a table 400 may include a distance threshold field 405 and a slot format field 410. As further illustrated, table 400 includes records 415-1 through 415-X (also referred to as records 415, or individually or generally as record 415) that each includes a grouping of fields 405 and 410. The distance-to-slot format information is illustrated in tabular form merely for the sake of description. In this regard, distance-to-slot format information may be implemented in a data structure different from a table. The data fields and values are exemplary.

Distance threshold field 405 may store data indicating a distance threshold value. The distance threshold value may be implemented as a single value or multiple values (e.g., a range or between two distance values).

Slot format field 410 may store data indicating a slot format. For example, slot format field 410 may store an identifier of a slot format. According to some exemplary implementations, slot format field 410 may store a sequence of slot format identifiers (e.g., 0, 30, 1, etc.) that may be used to manage uplink and downlink communication. For example, a sequence of slot formats may be repeated (e.g., 0, 3, 5, 0, 3, 5, etc.) until a new sequence is configured. According to still other exemplary implementations, slot format field 410 may indicate the number of flexible symbols to be used. For example, slot format field 410 may indicate a minimum, a maximum, or a range of values pertaining to the number of flexible symbols of a permissible slot format. According to still other exemplary implementations, slot format field 410 may indicate the number (e.g., minimum, maximum, range of) of downlink symbols and/or uplink symbols. Exemplary slot formats are described below.

According to other exemplary embodiments, the distance-to-slot format information may include additional, different, and/or fewer instances of data than those instances of data depicted and described.

FIG. 4B is a diagram illustrating exemplary slot formats 450. Various standard organizations (e.g., Third Generation Partnership Project (3GPP), European Telecommunications Standards Institute (ETSI), etc.) have specified slot formats that may be used. For example, 3GPP has specified 61 pre-defined combinations within a slot. However, embodiments of the TDD slot format selection service are not limited to a standards body's slot formats. For example, customized slot formats may be implemented in addition to or instead of those specified by a standards body.

As illustrated, a slot format may indicate a configuration for a downlink symbol ("D"), an uplink symbol ("U"), and a flexible symbol ("F"). Field 455 indicates an identifier of a slot format. Field 460 indicates a sequence of symbols (e.g., D, U, and/or F) associated with the slot format. For example, a "D" symbol may indicate a time period for downlink transmission, a "U" symbol may indicate a time period for uplink transmission, and an "F" symbol may indicate a time period for uplink/downlink switching and guarding against the impact of air-interface propagation delay. The duration of the slot format may be based on a time period associated with a radio frame (e.g., a 5G radio frame, a 4G radio frame, etc.) and/or a subframe, for example.

According to various exemplary embodiments, access device 107 may configure or update end device 130 as to the slot format to use based on various radio messages, such as a Master Information Block (MIB) message, a System Information Block (SIB) message, a Radio Resource Control (RRC) message (e.g., an RRC Connection Reconfiguration message, etc.), a proprietary message, and/or some other type of radio message. For example, access device 107 may broadcast slot format configuration information to multiple end devices 130 (e.g., using MIB or SIB messages) or target individual end devices 130 using an RRC message or a proprietary message.

Figure 3C:
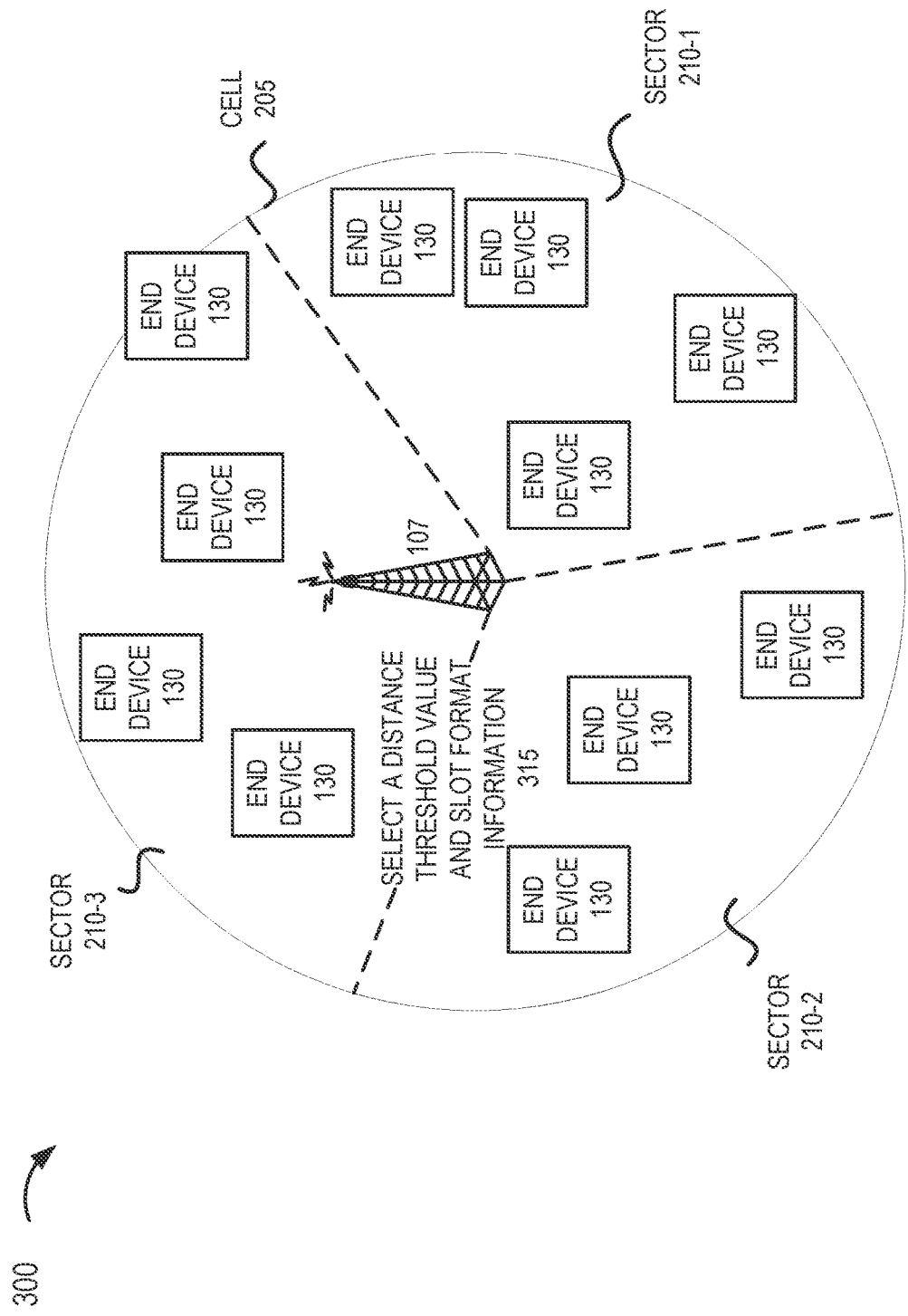

Referring to FIG. 3C, based on the comparison explained in relation to FIG. 3B, access device 107 may select a distance threshold value that is satisfied by the calculated distance between access device 107 and end device 130, and select slot format information that correlates to the distance threshold value 315. For example, access device 107 may perform a lookup with the distance-to-slot format information depicted in FIG. 4A and described herein.

According to some exemplary embodiments, when multiple end devices 130 may be subject to TDD slot format configuration, access device 107 may calculate the percentage of end devices 130 out of the total end devices 130. For example, access device 107 may be configured with a policy or rule in which if X % of end devices 130 exceed a distance Y, then configure slot format Z. Thus, access device 107 may calculate distances for end devices 130, and in combination with this policy or rule, select the appropriate TDD slot configuration. In this regard, table 400 may include an additional field that correlates a certain percentage of end devices 130 with fields 405 and 410.

According to various exemplary embodiments, as previously mentioned, the slot format information may indicate a slot format, a sequence of slot formats, a slot format that has a minimum number of flexible symbols, downlink symbols, and/or uplink symbols, or some other configuration pertaining to a slot format and/or type of symbol. According to some exemplary embodiments, the number of flexible symbols of a TDD slot format configuration may be proportional to the distance between access device 107 and end device 130. For example, smaller distances may be configured with fewer flexible symbols, and larger distances may be configured with a larger number of flexible symbols.

According to an exemplary embodiment, the TDD slot format selection service may configure slot format information based on other criteria. For example, access device 107 may analyze scheduling and/or usage of physical resource blocks (PRBs) (e.g., air interface resources) in relation to uplink and downlink transmissions. Based on the analysis, access device 107 may identify an end device 130 that is biased to uplink or downlink transmissions. According to an exemplary implementation, for a downlink-biased end device 130, access device 107 may not schedule any uplink traffic for a first "U" symbol (or multiple "U" symbols) that may occur after an "F" symbol. As an example, referring back to FIG. 4B, access device 107 may not schedule uplink traffic for a "U" symbol in relation to slot formats 29, 30, or 31. Conversely, for an uplink-biased end device 130, access device 107 may not schedule any downlink traffic for one or multiple "D" symbols occurring (immediately) before an "F" symbol. For example, referring to FIG. 4B, slot format 30, access device 107 may not schedule any downlink traffic for "D" symbol in position (9) or "D" symbols in positions (9) and (8). In this way, additional switching time/guard time may be allotted to end device 130 without having to reconfigure the currently configured slot format associated with end device 130. According to some exemplary embodiments, access device 107 may transmit a radio message (e.g., an RRC message or other radio message) to instruct end device 130 to ignore a particular "D" symbol and/or a particular "U" symbol. Alternatively, the radio message may indicate to use the particular "D" symbol and/or the "U" symbol as an "F" symbol (e.g., switching time). Other variations of this may be implemented. For example, access device 107 may transmit a radio message to instruct end device 130 to ignore a particular "F" symbol for switching and use the "F" symbol for uplink or downlink transmission. For example, when there is a downlink bias, end device 130 may use the "F" symbol for downlink transmission. Access device 107 may schedule the downlink transmission for the "F" symbol. In this way, the use of the "F" symbol may be based on the uplink or downlink bias determined by access device 107 and associated traffic profile.

Figure 4C:
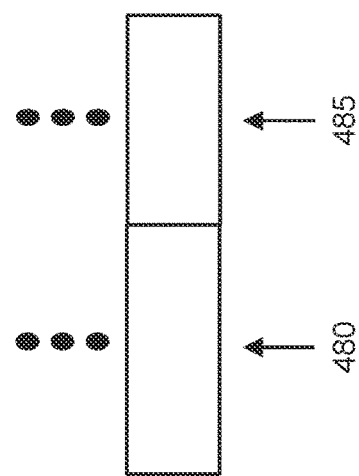
FIG. 4C is a diagram illustrated TDD ratio information.

According to an exemplary embodiment, access device 107 may configure the slot format configuration based on a data volume (e.g., amount of data) pertaining to uplink and downlink traffic. For example, access device 107 may calculate a ratio of data volume (e.g., in bytes, megabytes (MB), gigabytes (GB), etc.) between uplink and downlink transmissions. FIG. 4C is a diagram illustrating exemplary data volume information 475. According to this example, downlink-to-uplink data volume ratio 480 may be correlated to a TDD ratio 485. The TDD ratio may relate to a corresponding downlink-to-uplink symbol ratio associated with a given slot format. According to other examples, an uplink-to-downlink data volume ratio may be implemented, in which the TDD ratio may relate to a corresponding uplink-to-downlink symbol ratio of a slot format. The slot format (e.g., a single slot format, a sequence of slot formats, etc.) may be selected to provide a correlated TDD ratio. According to some exemplary embodiments, the traffic profile (e.g., uplink and downlink data volumes or ratios thereof) may be correlated to a threshold distance threshold value and corresponding TDD configuration that includes a correlated number of flexible symbols.

Figure 3D:
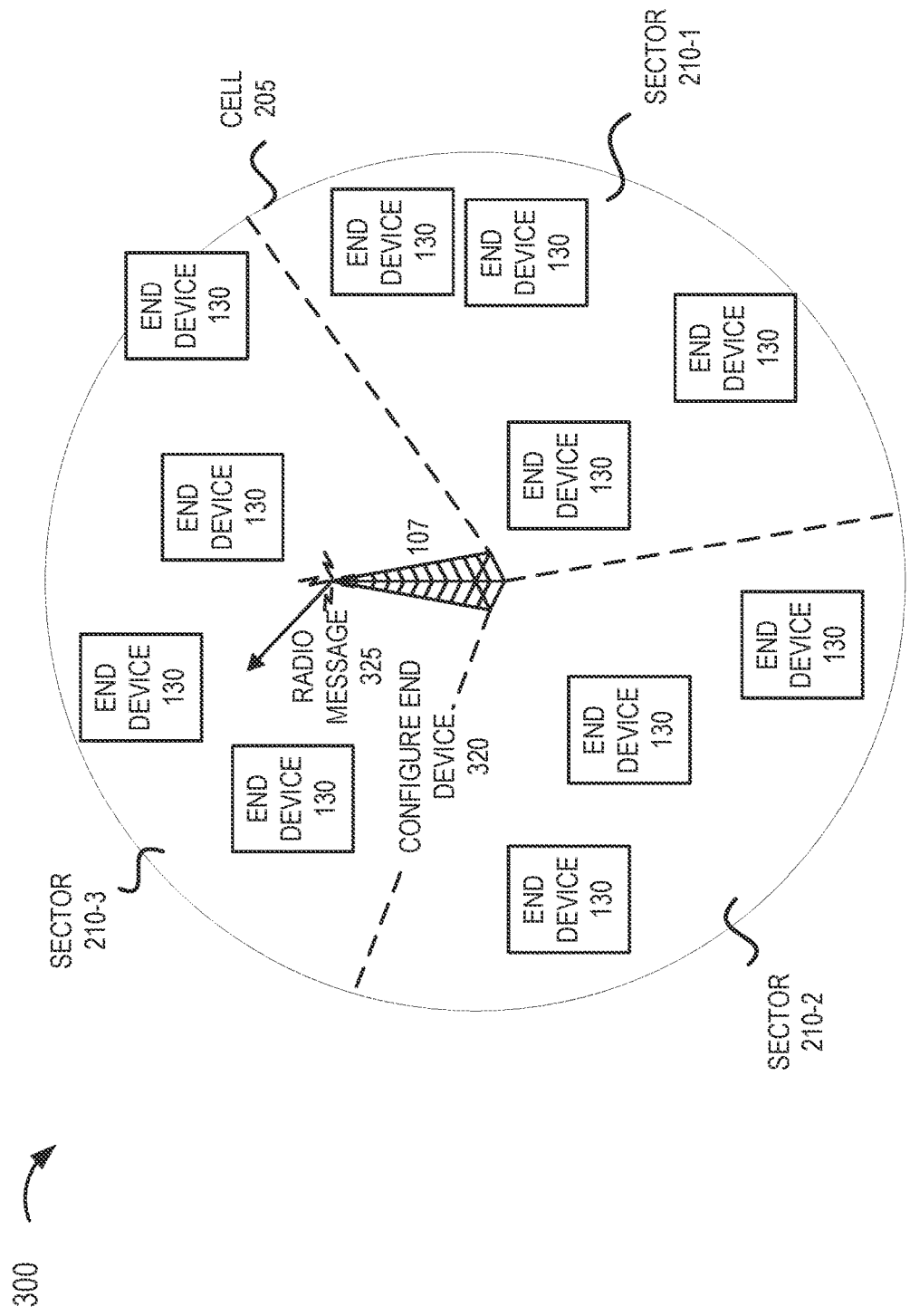
Figure 3E:
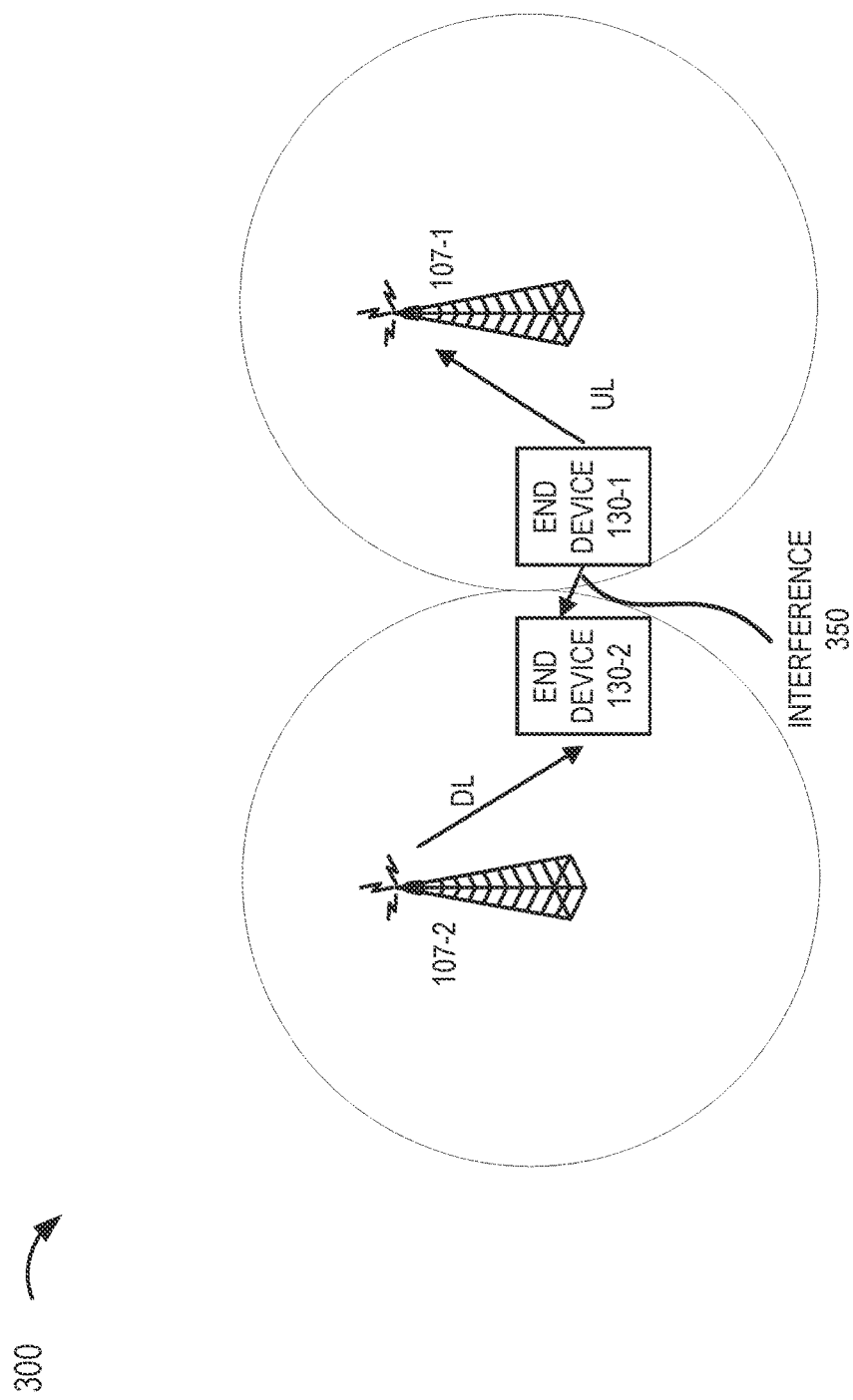
Figure 3F:
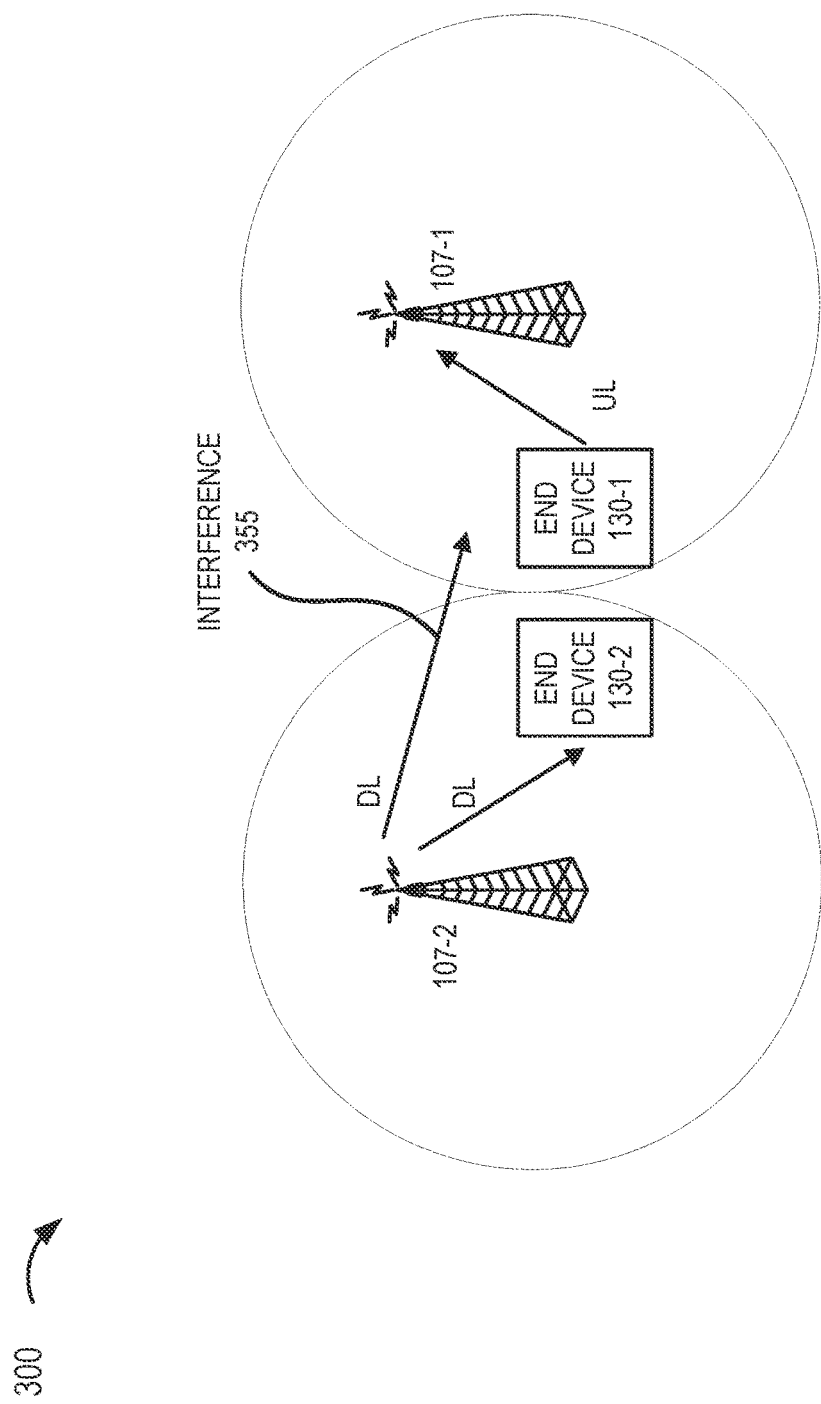
Figure 3G:
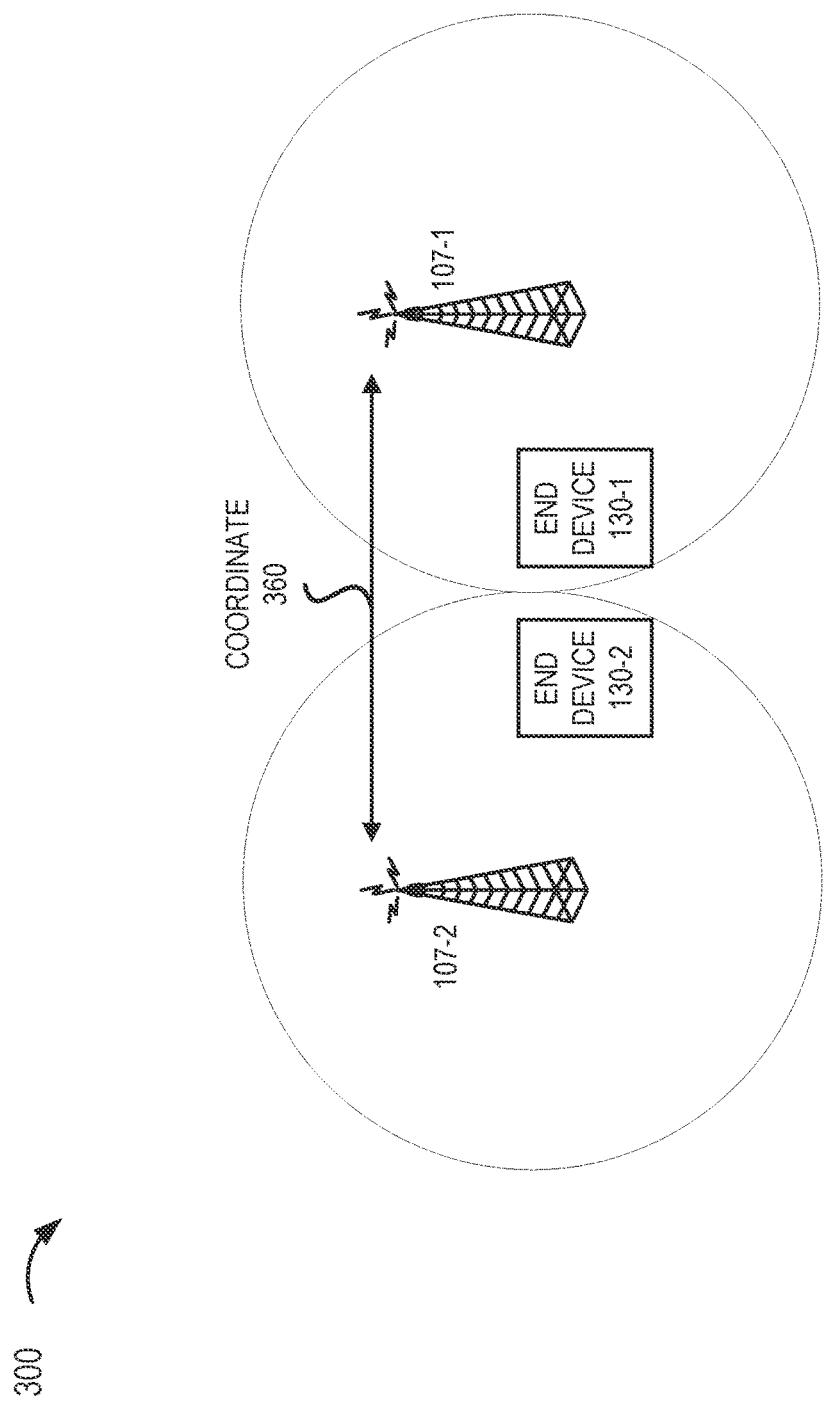

Referring to FIG. 3D, in response to selecting the slot format information, access device 107 may configure one or multiple end devices 320. For example, access device 107 may transmit a radio message 325 that includes the slot format information. The slot format information may include one or multiple slot format identifiers. The slot format information may include other types of information, as described herein. End device 130 may receive the radio message and operate according to the TDD slot format configuration information for subsequent downlink and/or uplink communications. For example, end device 130 may be pre-configured with slot formats and slot format identifiers.

As previously described, TDD communication may be subject to interference. The interference may relate to end devices 130 or access devices 107, for example. This may be referred to as cross-link interference or cross-slot interference. For example, referring to FIG. 3E, an uplink (UL) transmission from end device 130-1 to access device 107-1 may cause interference 350 for end device 130-2, and a downlink (DL) transmission from access device 107-2 to end device 130-2. According to another example, referring to FIG. 3F, a downlink transmission from access device 107-2 may cause interference 355 for access device 107-1 and an uplink transmission from end device 130-1 to access device 107-1. The transmitted power of the downlink is greater than in the uplink. As such, neighboring access devices 107 using different TDD ratios or access devices 107 that are not coordinated or synchronized may result in undesirable interference. As a result, TDD interference may cause network performance degradation.

According to an exemplary embodiment, the TDD slot format selection service may use interference (e.g., predictive, existing, etc.) as a factor to select a slot format configuration. For example, referring to FIG. 3G, each access device 107 may calculate an interference value. According to an exemplary embodiment, when the interference value satisfies a minimum threshold value, access device 107 may invoke a coordination procedure. According to other exemplary embodiments, this step may be omitted. As illustrated, access devices 107 may coordinate 360 on the selection of a TDD ratio and/or other slot format configuration to use to minimize interference. According to some exemplary implementations, the access device 107 servicing the higher number of end devices 130 and/or larger data volume may select the slot format configuration. After selection, access devices 107 may operate according to the coordinated TDD configuration information. Additionally, interference monitoring may be implemented at access device 107 since the differences in time of its DL/UL pattern may be compared to a neighboring cell, and access device 107 may identify if a user is experiencing 100% or another threshold value block error rate during the slots of mismatch or DL-UL overlap with the neighboring cell.

FIGS. 3A-3G illustrate an exemplary embodiment of processes of the TDD slot format selection service, according to other exemplary scenarios, the TDD slot format selection service may perform additional operations, fewer operations, and/or different operations than those illustrated and described.

FIG. 5 is a diagram illustrating exemplary components of a device 500 that may be included in one or more of the devices described herein. For example, device 500 may correspond to access device 107, external device 117, core device 122, end device 130, and/or other types of network devices, as described herein. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation, or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, learning, model-based, etc.

Memory/storage 515 includes one or multiple memories and/or one or multiple other types of storage mediums. For example, memory/storage 515 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. As an example, with reference to access device 107, software 520 may include an application that, when executed by processor 510, provides a function and/or a process of the TDD slot format selection service, as described herein. Software 520 may also include firmware, middleware, microcode, hardware description language (HDL), and/or other form of instruction. Software 520 may also be virtualized. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces and/or wired interfaces. For example, communication interface 525 may include one or multiple transmitters and receivers, or transceivers. Communication interface 525 may operate according to a protocol stack and a communication standard. Communication interface 525 may include an antenna. Communication interface 525 may include various processing logic or circuitry (e.g., multiplexing/de-multiplexing, filtering, amplifying, converting, error correction, application programming interface (API), etc.). Communication interface 525 may be implemented as a point-to-point interface, a service-based interface, or a reference interface, for example.

Input 530 permits an input into device 500. For example, input 530 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 500 may be implemented in the same manner. For example, device 500 may be instantiated, created, deleted, or some other operational state during its life cycle (e.g., refreshed, paused, suspended, rebooting, or another type of state or status), using well-known virtualization technologies (e.g., hypervisor, container engine, virtual container, virtual machine, etc.) in an application service layer network (e.g., external network 115) and/or another type of network (e.g., access network 105, core network 120, etc.). Thus, network devices described herein may be implemented as device 500.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a function or a process described herein. Alternatively, for example, according to other implementations, device 500 performs a function or a process described herein based on the execution of hardware (processor 510, etc.).

Figure 6:
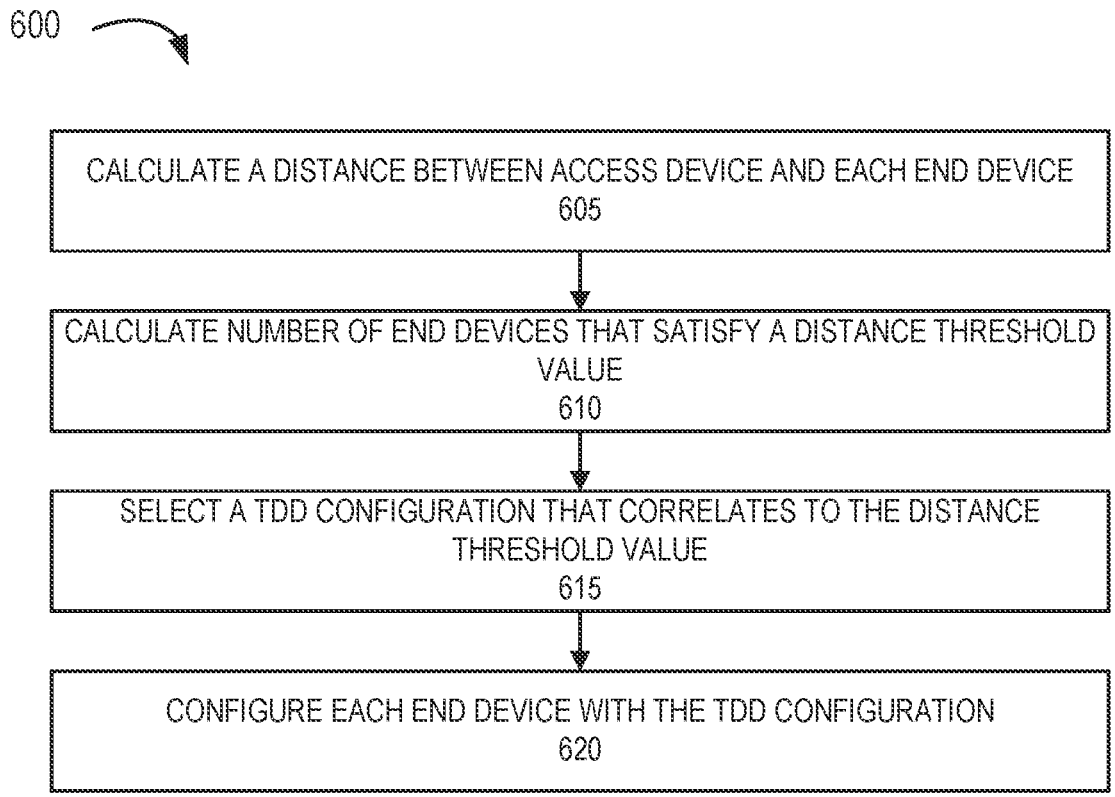
FIG. 6 is a flow diagram illustrating an exemplary process of an exemplary embodiment of the TDD slot format selection service.

FIG. 6 is a flow diagram illustrating an exemplary process 600 of an exemplary embodiment of the TDD slot format selection service. According to an exemplary embodiment, access device 107 may perform a step of process 600. According to an exemplary implementation, processor 510 executes software 520 to perform the step of process 600, as described herein. Alternatively, the step may be performed by execution of only hardware.

In block 605, access device 107 may calculate a distance between access device 107 and each end device 107. End device 107 may be situated in a cell, a sector, or a sub-sector of access device 107. End device 107 may be attached (e.g., an RRC connection) to access device 107. Access device 107 may calculate the distance based on signal arrival time, geographic coordinates (e.g., geographic coordinates of access device 107 and end device 130), timing advance mechanism, or other known methods, as described herein.

In block 610, access device 107 may calculate the number of end devices 130 that satisfy a distance threshold value. For example, based on the distances associated with end devices 130, access device 107 may determine a ratio of end devices 130 or a percentage of end devices 130 that satisfy a threshold distance value. According to some exemplary implementations, there may be a ratio or percentage threshold value that correlates to the threshold distance value. The ratio or percentage threshold value may be less than a total number of end devices 107 that are subject to the TDD configuration of a given wireless service area and/or carrier (e.g., cell, sector, sub-sector, etc.).

In block 615, access device 107 may select a TDD configuration that correlates to the distance threshold value. For example, access device 107 may perform a lookup with distance-to-slot format information, as described herein. Access The TDD configuration may include slot format information, as described herein.

In block 620, access device 107 may configure end devices 130 with the TDD configuration. For example, access device 107 may transmit a radio message that includes the TDD configuration.

Although FIG. 6 illustrates an exemplary embodiment of a process of the TDD slot format selection service, according to other exemplary scenarios, the TDD slot format selection service may perform additional operations, fewer operations, and/or different operations than those illustrated and described. For example, access device 107 may use other criteria to select the TDD configuration, such as data volume in the uplink and downlink associated with end devices 130 and/or an interference value associated with a neighboring access device 107.

Figure 7:
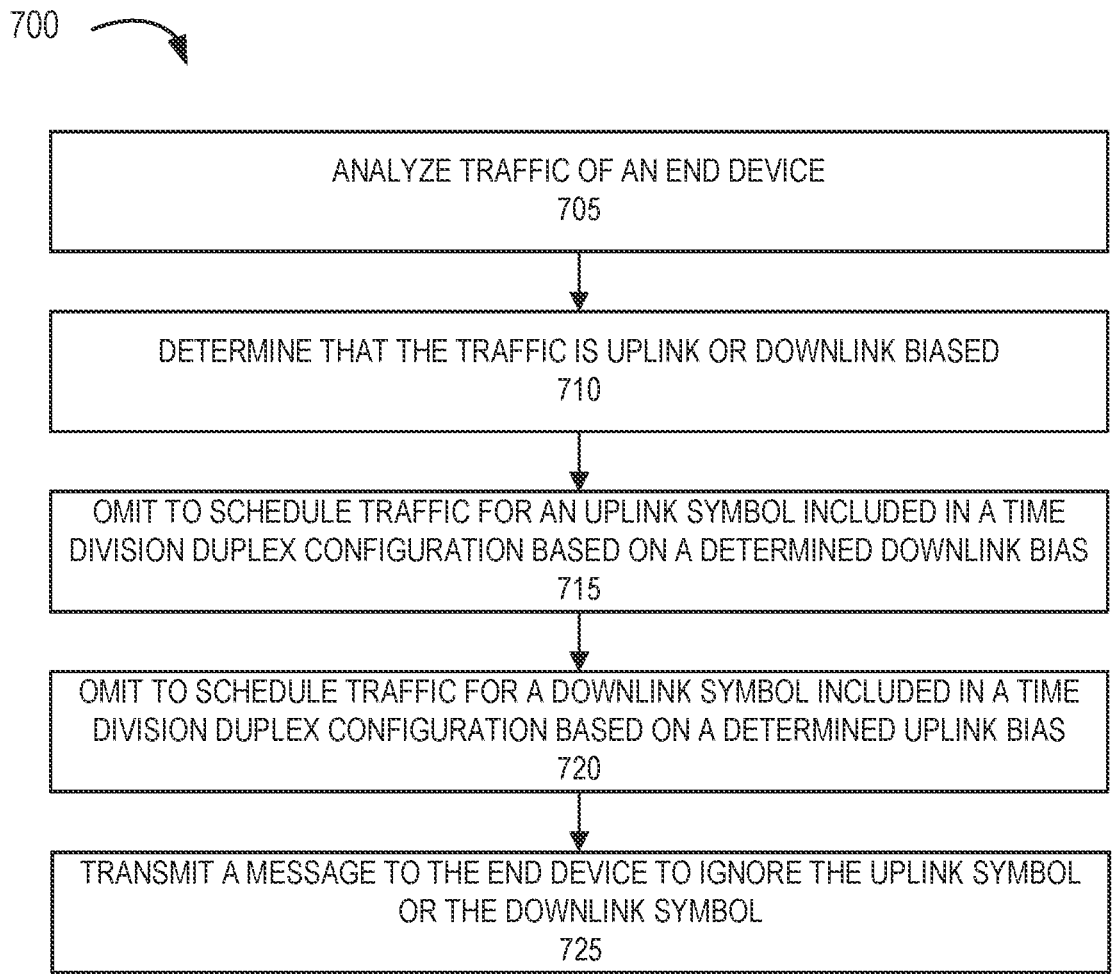
FIG. 7 is a flow diagram illustrating another exemplary process of an exemplary embodiment of the TDD slot format selection service.

FIG. 7 is a flow diagram illustrating an exemplary process 700 of an exemplary embodiment of the TDD slot format selection service. According to an exemplary embodiment, access device 107 may perform a step of process 700. According to an exemplary implementation, processor 510 executes software 520 to perform the step of process 700, as described herein. Alternatively, the step may be performed by execution of only hardware.

In block 705, access device 107 may analyze traffic of end device 130. For example, access device 107 may analyze uplink and downlink data volumes.

In block 710, access device 107 may determine that the traffic for end device 130 is biased in the uplink or the downlink based on the analysis.

In block 715, access device 107 may omit to schedule traffic for an uplink symbol included in a time division duplex configuration based on a determined downlink bias. For example, access device 107 may select one or multiple uplink symbols that may be adjacent (e.g., preceding or subsequent) to a flexible symbol of a TDD slot format that end device 130 is using, as described herein.

In block 720, access device 107 may omit to schedule traffic for a downlink symbol included in a time division duplex configuration based on a determined uplink bias. For example, access device 107 may select one or multiple downlink symbols that may be adjacent (e.g., preceding or subsequent) to a flexible symbol of a TDD slot format that end device 130 is using, as described herein.

In block 725, access device 107 may generate and transmit a message to end device 130. For example, an RRC message may indicate to ignore the uplink symbol or the downlink symbol for which the scheduling of traffic has been omitted. Alternatively, the RRC message may indicate to use the uplink symbol or the downlink symbol as a flexible symbol (e.g., for switching time).

Although FIG. 7 illustrates an exemplary embodiment of a process of the TDD slot format selection service, according to other exemplary scenarios, the TDD slot format selection service may perform additional operations, fewer operations, and/or different operations than those illustrated and described. For example, access device 107 may generate and transmit a message that indicates to use a flexible symbol for uplink transmission or downlink transmission.

Additionally, as previously described, access device 107 may determine a downlink or an uplink traffic bias for end device 130 and modify the scheduling of uplink or downlink traffic for uplink or downlink symbols included in a TDD configuration.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIG. 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
    calculating, by a network device of a radio access network, a distance between the network device and an end device that is attached to the network device;
    determining, by the network device, a threshold distance value that is satisfied by the distance;
    determining, by the network device, a traffic profile for the end device that includes an uplink data volume value and a downlink data volume value;
    selecting, by the network device, a time division duplex configuration that correlates to the threshold distance value and the traffic profile; and
    transmitting, by the network device to the end device, a radio message that includes the time division duplex configuration.

2. The method of claim 1, further comprising:
    storing, by the network device, threshold distance values that are correlated to different time division duplex configurations.

3. The method of claim 1, wherein the end device comprises multiple end devices, and the method further comprising:
    determining, by the network device, a number of the end devices whose distances satisfy the threshold distance value.

4. The method of claim 3, wherein the number of the end devices is less than a total number of the end devices.

5. The method of claim 1, wherein the time division duplex configuration includes one or multiple flexible symbols that correlate to the threshold distance value.

6. The method of claim 1, wherein the network device is a next generation Node B (gNB), an evolved Node B (eNB), or an evolved Long Term Evolution (eLTE) eNB.

7. The method of claim 1, further comprising:
    determining, by the network device, an interference value relative to another network device of the radio access network, and wherein the selecting further comprises:
    selecting, by the network device, the time division duplex configuration that correlates to the threshold distance value, the traffic profile, and is based on the interference value.

8. The method of claim 1, further comprising:
    determining, by the network device, an uplink bias or a downlink bias for traffic pertaining to the end device; and
    omitting, by the network device, to schedule traffic for an uplink symbol included in the time division duplex configuration based on a determined downlink bias; or
    omitting, by the network device, to schedule traffic for a downlink symbol included in the time division duplex configuration based on a determined uplink bias.

9. A network device comprising:
    a processor configured to:

calculate a distance between the network device and an end device that is attached to the network device, wherein the network device is of a radio access network;

determine a threshold distance value that is satisfied by the distance;

determine a traffic profile for the end device that includes an uplink data volume value and a downlink data volume value;

select a time division duplex configuration that correlates to the threshold distance value and the traffic profile; and transmit to the end device, a radio message that includes the time division duplex configuration.

10. The network device of claim 9, wherein the processor is further configured to:

store threshold distance values that are correlated to different time division duplex configurations.

11. The network device of claim 9, wherein the end device comprises multiple end devices, and the processor is further configured to:

determine a number of the end devices whose distances satisfy the threshold distance value.

12. The network device of claim 11, wherein the number of the end devices is less than a total number of the end devices.

13. The network device of claim 9, wherein the time division duplex configuration includes one or multiple flexible symbols that correlate to the threshold distance value.

14. The network device of claim 9, wherein the network device is a next generation Node B (gNB), an evolved Node B (eNB), or an evolved Long Term Evolution (eLTE) eNB.

15. The network device of claim 9, wherein the processor is further configured to:

determine an interference value relative to another network device of the radio access network, and wherein the processor is further configured to:

select the time division duplex configuration that correlates to the threshold distance value, the traffic profile, and is based on the interference value.

16. The network device of claim 9, wherein the processor is further configured to:

determine an uplink bias or a downlink bias for traffic pertaining to the end device; and omit to schedule traffic for an uplink symbol included in the time division duplex configuration based on a determined downlink bias; or omit to schedule traffic for a downlink symbol included in the time division duplex configuration based on a determined uplink bias.

17. A non-transitory computer-readable storage medium storing instructions executable by a processor of a network device, which when executed cause the network device to:

calculate a distance between the network device and an end device that is attached to the network device, wherein the network device is of a radio access network;

determine a threshold distance value that is satisfied by the distance;

determine a traffic profile for the end device that includes an uplink data volume value and a downlink data volume value;

select a time division duplex configuration that correlates to the threshold distance value and the traffic profile; and transmit to the end device, a radio message that includes the time division duplex configuration.

18. The non-transitory computer-readable storage medium of claim 17, the instructions further comprise instructions, which when executed cause the network device to:

store threshold distance values that are correlated to different time division duplex configurations.

19. The non-transitory computer-readable storage medium of claim 17, the instructions further comprise instructions, which when executed cause the network device to:

determine an interference value relative to another network device of the radio access network; and select the time division duplex configuration that correlates to the threshold distance value, the traffic profile, and is based on the interference value.

20. The non-transitory computer-readable storage medium of claim 17, wherein the network device is a next generation Node B (gNB), an evolved Node B (eNB), or an evolved Long Term Evolution (eLTE) eNB.

* * * * *